United States Patent Office 3,654,196
Patented Apr. 4, 1972

3,654,196
METHOD OF MAKING POLYAMIDE FOAMS
Raymond Frederick Moore and Eric Smith, Manchester, England, assignors to Imperial Chemical Industries Limited, London, England
No Drawing. Filed Mar. 22, 1971, Ser. No. 126,902
Claims priority, application Great Britain, Apr. 17, 1970, 18,475/70
Int. Cl. C08j 1/22
U.S. Cl. 260—2.5 N                10 Claims

ABSTRACT OF THE DISCLOSURE

Manufacture of polyamide foam by heating a polyamide to a temperature within its working range with an oxy-acid of phosphorus, preferably orthophosphoric acid, and a metal salt of a carboxylic acid, the salt being stable at the heating temperature but the free carboxylic acid being one which decarboxylates at the heating temperature, particularly a 2 to 6 C acid with a carboxylic group activated by a keto group or a carboxylic acid or ester group. Sodium or potassium oxalate is preferred.

---

This invention relates to the manufacture of foamed polyamides. The term polyamide refers to the thermoplastic polymers which are obtained by polycondensation of diamines with dicarboxylic acids, or self-condensation of amino acids or lactams. More particularly it refers to those linear polyamides which have fibre-forming characteristics and are termed "nylon." Specifically it includes:

Polyhexamethyleneadipamide (nylon 6:6)
polycaprolactam (nylon 6)
polyundecanolactam (nylon 11)
polydodecanolactam (nylon 12)
polyhexamethylene sebacamide (nylon 6:10)
polyhexamethylene isophthalamide (nylon 6:iP)
polyhexamethylene terephthalamide (nylon 6:T)
poly-metaxylylene adipamide (nylon MXD:6)

and co-polymers therefrom.

Many foamed thermoplastic materials are known and some, for example foamed polystyrene, are now in widespread use for decorative and insulation purposes. Despite the read availability of polyamides (nylons) particularly nylon 6.6 it is remarkable that foams from these materials have not yet proved commercially successful. One of the difficulties encountered in producing satisfactory foamed polyamides is the inherent unsuitability of the blowing agents which are used with other plastic materials. With polyamides these blowing agents usually give comparatively poor results.

According to the invention a process for the manufacture of a polyamide foam comprises heating a polyamide to a temperature within its working range, as hereinafter defined, with an oxy-acid of phosphorus and a metal salt of a carboxylic acid, said metal salt being substantially stable at temperatures within the working range of the polyamide, but the carboxylic acid from which it is derived being one which decarboxylates at temperatures within the said working range.

The working range of a polyamide is defined as the range of temperature between its melting point and decomposition temperature.

Oxy-acids of phosphorus which may be used in the process of the invention include the following:
Hypophosphorous acid;
Alkyl phosphonous and dialkylphosphonous acids;
Phosphorous acid;
Alkyl-, cycloalkyl- and aryl-phosphonic acids and their monoalkyl, or monocycloalkyl and monoaryl esters;
Orthophosphoric acid;
Phosphoric acids having a lower $H_2O:P_2O_5$ ratio than orthophosphoric acid e.g. metaphosphoric acid, pyrophosphoric acid, hexametaphosphoric acid and trimetaphosphoric acid;
Partial esters of phosphoric acids with alcohols or phenols, e.g. diethyl orthophosphate and monoglycero-orthophosphate.

Although any metal salt having the specified characteristics may be used in the process of the invention salts of the following metals are preferred:

Metals in Groups I-A and II of Mendeleef's Periodic System; rare earth metals; gallium, indium, thallium, lead, manganese, iron, cobalt, nickel.

Especially preferred are salts of sodium and potassium. Desirably the metal salt should be in a finely divided state.

In a particular class of carboxylic acids having the above prescribed requirement, a carboxylic acid group is activated by proximity (in α- or β-position) to an electron attracting group, particularly a ketone group or a carboxylic acid or ester group. Preferred carboxylic acids are of 2 to 6 carbon atoms.

Specific carboxylic acids of this type are oxalic acid, malonic acid and its monoethyl ester, oxomalonic acid, citric acid.

The extent of foaming which occurs during the process of the invention is predetermined by the amounts of phosphorus oxy-acid and metal salt which are caused to react in the molten polymer. Although it is not necessary to have the reactants present in stoichiometric amounts it is advantageous to at least utilise the full blowing power of the acid by having present a slight excess of the metal salt. Subject to these preferences there may be used for example from 0.5 mole percent to 5 mole percent of oxy-acid of phosphorus and from 0.5 mole percent to 10 mole percent of metal salt, based on the polyamide.

In one embodiment of the process of the invention the oxy-acid of phosphorus is first incorporated into the polyamide, either by stirring it into the molten polyamide or by incorporation during polymerisation. The metal salt is added and mixed well in at a temperature just above that at which the polyamide solidifies. Foaming occurs when the resultant mixture is allowed to stand at said temperature and setting at the required density is accomplished by cooling below the solidification temperature. Conveniently heating of the mixture may be commenced in an extruder, from which the mixture is extruded and allowed to foam and cool. Alternatively an injection moulding machine preferably of the reciprocating screw type may be used to make foamed moulded shapes by means of the process of the invention. If desired the invention may be used in the production of articles having a cellular core and an unfoamed surface skin by the method described and claimed in United Kingdom Pat. No. 1,156,- 217.

In the proces of the invention it is preferred to use a polyamide of high molecular weight since polyamides of low molecular weight have low melt viscosities which tend to render the foam unstable, and adequate build-up of molecular weight (and hence melt viscosity), through normal polycondensation is not achieved in the duration of the foaming process in the presence of the oxy-acid of phosphorus. The best results are obtained by using a polyamide with a relative viscosity of at least 15 (as measured on an 8.4% w./w. solution in 90% formic acid).

If desired a surface active agent, preferably of the nonionic type, may be present during heating of the polyamide, oxy-acid of phosphorus and metal salt in order to preserve a fine dispersion of gas bubbles during the transition to rigid foam. The use of surface active agents in the production of polyamide foams is within the claims of our United Kingdom Pat. No. 1,208,782 (application No. 26,793/67). Some of the most effective surface active agents are alkylphenols containing at least 10 carbon atoms, alkanols or alklamines containing at least 6 carbon atoms, and condensates thereof with an alkylene oxide preferably containing from 1 to 30 moles of alkylene oxide. Especially effective surface active agents are alkanols containing 10 to 20 carbon atoms e.g. cetyl alcohol and condensates of such alcohols with up to 6 moles of alkylene oxide e.g. ethylene oxide. The product of this type which is sold by Imperial Chemical Industries Limited under the name Lubrol MOA (registered trademark) is particularly effective. Other especially effective surface active agents are condensates of alkylamines, containing 10 to 20 carbon atoms, with up to 5 moles of alkylene oxide e.g. ethylene oxide. The product of this type which is sold by Armour Hess Chemicals Limited, under the name Ethomeen S/12 is particularly effective.

Polyamide foams produced by the invention are light in weight but have good strength. They have potential for use in the manufacture of a variety of light-weight load-bearing structures, for example in the building and furniture industries.

Our U.K. Pat. No. 1,227,146 (application No. 15,393/68) describes and claims the manufacture of a polyamide foams by heating a polyamide above its working temperature with a metal carbonate or bicarbonate and an oxyacid of phosphorus. In the present invention the use of carboxylic acid salts, especially oxylic acid salts produces higher gas yields than are obtained by operating the process of U.K. Pat. No. 1,227,146 under comparable conditions. This enables the phosphorus oxyacid usage to be reduced, thereby reducing any harmful effect which such acid may have on the mechanical properties of the polyamide. Consequently the foams produced by the present invention are better textured and have improved mechanical properties.

The invention is illustrated but not limited by the following examples in which all parts and percentages are by weight.

EXAMPLE 1

Nylon 6.6 (25 g.) having a relative viscosity of 45 (as measured on a 8.4% solution in 90% formic acid/water), Lubrol MOA (0.5 ml.) and 80% orthophosphoric acid (0.2 g., 1.5 mole percent of polymer) were heated in an atmosphere of nitrogen in a glass tube in a vapour bath at 280° C. until molten and then stirred for 10 minutes. Finely divided dry sodium oxalate (0.6 g.) was added, the mixture stirred rapidly for 30 seconds and the stirrer removed. Foaming commenced immediately. After 1 minute heating was discontinued and the foam was allowed to cool. The foam obtained was tough and rigid with fine, even texture and white in colour, average density 0.15 g./cm.$^3$.

Foams were also produced in similar manner using other anhydrous metal oxalates including potassium oxalate, zinc oxalate, calcium oxalate, copper oxalate, lead oxalate and cobalt oxalate.

EXAMPLE 2

Nylon 6 (25 g.), Lubrol MOA (0.5 ml.) and 80% orthophosphoric acid (0.2 g.) were melted under nitrogen and stirred at 240° C. Dry powdered sodium oxalate (0.5 g.) was added, the mixture stirred rapidly for 30 seconds and the stirrer removed. After 1 minute the resulting foam was allowed to cool to room temperature. It was tough with fine texture; average density 0.26 g./cm.$^3$.

EXAMPLE 3

Example 2 was repeated but using nylon 6.10 instead of nylon 6. The resulting foam had good colour and texture with an average density 0.36 g./cm.$^3$.

EXAMPLE 4

Nylon 6.6 (25 g.), Lubrol MOA (0.5 ml.) and 50% aqueous hypophosphorous acid (0.4 ml.) were melted under nitrogen at 280° C. and stirred for 10 minutes before adding dry, powdered sodium oxalate (0.5 g.). After stirring rapidly for 30 seconds, the stirrer was removed and the mixture foamed for 6 minutes before cooling. The product was a tough, even textured, pearly-coloured foam; average density 0.19 g./cm.$^3$.

In place of hypophosphorous acid in this example there may be used phosphorous acid, orthophosphoric acid, metaphosphoric acid, pyrophosphoric acid, hexametaphosphoric acid, trimetaphosphoric acid or the mixture which is sold as "polyphosphoric acid" and consists largely of tetraphosphoric acid $H_6P_3O_{13}$.

EXAMPLE 5

To a stirred mixture of molten nylon 6.6 (25 g.), Lubrol MOA (0.5 ml.) and cyclohexylphosphonic acid (0.5 g.) at 280° C. was added powdered sodium oxalate (0.5 g.). After stirring for 30 seconds the stirrer was removed, heating was discontinued after a further 5 minutes. A tough foam was obtained with average density 0.4 g./cm.$^3$.

EXAMPLE 6

To a stirred mixture of molten nylon 6.6 (25 g.), Lubrol MOA (0.5 ml.) and 80% orthophosphoric acid (0.1 g.) wt. 280° C. was added powdered calcium malonate (0.5 g.). After 30 seconds the stirrer was removed; heating was discontinued after a further 2 minutes. A tough white foam was obtained with average density 0.2 g./cm.$^3$.

EXAMPLE 7

Example 6 was repeated substituting finely divided anhydrous trisodium citrate for calcium malonate. A similar foam was obtained.

EXAMPLE 8

Nylon 6.6 polymer granules containing 1.0 mole percent orthophosphoric acid added during the polymerisation process were dried at 100° C. in vacuo for 24 hours, then coated with 1.5% Lubrol MOA and 1.5% finely divided sodium oxalate by tumbling on a rollermill. The coated chip was fed to a 2 cm. diameter single-screw extruder heated at 285° C., and the motion extrudate passed into a pre-heated metal mould at 265° C. When sufficient of the foaming composition to give the required foam density had been fed to the mould, the feed was diverted and the mould allowed to cool to room temperature. A block of foam was obtained with average density 0.24 g./cm.$^3$.

EXAMPLE 9

Granules of a 6.6/6iP nylon random copolymer (composed of 90 parts hexamethylene adipamide units and 10 parts hexamethylene isophthalamide units and containing 1.5 mole percent of orthophosphoric acid) having a relative viscosity of 40, were dried in vacuo for 24 hours and subsequently coated with 1½% Lubrol MOA and 1½% finely divided sodium oxalate by tumbling.

Using the procedure described in U.K. Pat. No. 1,156,217, uncoated nylon 6.6/6iP (90:10) copolymer granules sufficient to fill one half of the barrel were fed to a 500 g. injection moulding machine and allowed to reach the front of the barrel. The remainder of the barrel was then filled with the coated nylon copolymer granules. The temperature along the barrel ranged from 250° C. at the feed end to 280° C. at the nozzle.

The complete charge was then injected into a 45 cm. diameter disc mould which had a cavity 3 mm. wide and allowed to cool therein for 1 second. The pressure holding the mould was then reduced and the mould was allowed to cool before the mould was completely opened and the sample removed.

A moulding having a surface skin 1 mm. thick sandwiching a foamed core 4 mm. thick was obtained, with overall average density of 0.55 g./cm.$^3$.

We claim:
1. A process for the manufacture of a polyamide foam comprising heating a polyamide to a temperature between its melting point and decomposition temperature with an oxy-acid of phosphorus and a metal salt of a carboxylic acid said metal salt being substantially stable at the temperature of heating, but the carboxylic acid from which it is derived being one which decarboxylates at this temperature, and the proportions of oxy-acid of phosphorus and metal salt being respectively from 0.5 to 5 and 0.5 to 10 mole percent, based on the polyamide.
2. Process according to claim 1 wherein the polyamide used has a relative viscosity of at least 15 (as measured on an 8.4% by weight solution in 90% formic acid).
3. Process according to claim 1 wherein the oxy-acid of phosphorus is orthophosphoric acid or a phosphoric acid having a lower $H_2O:P_2O_5$ ratio than orthophosphoric acid.
4. Process according to claim 1 wherein the carboxylic acid salt is a salt of a metal in Groups I-A or II of Mendeleef's Periodic System.
5. Process according to claim 1 wherein the carboxylic acid salt is a salt of sodium or potassium.
6. Process according to claim 1 wherein the salt is a salt of a carboxylic acid of 2 to 6 carbon atoms in which a carboxylic acid group is in $\alpha$- or $\beta$-position to a keto-group or a carboxylic acid or ester group.
7. Process according to claim 1 wherein the salt is a salt of oxalic acid.
8. Process according to claim 1 wherein heating of the polyamide, oxy-acid of phosphorus and metal salt is carried out in presence of a non-ionic surface active agent.
9. Process according to claim 8 wherein the surface active agent is a condensate of an alkanol containing 10 to 20 carbon atoms with up to 6 moles of ethylene oxide.
10. Process according to claim 8 wherein the surface active agent is a condensate of an alkylamine containing 10 to 20 carbon atoms with up to 5 moles of ethylene oxide.

References Cited
UNITED STATES PATENTS 2,478,879  8/1949  Ten Broeck, Jr. ____ 200—2.5 R

OTHER REFERENCES 1,227,146  4/1971  Great Britain _____ 260—2.5 N

MURRAY TILLMAN, Primary Examiner
M. FOELAK, Assistant Examiner

U.S. Cl. X.R.

264—48, 54, DIG 14, DIG 61